(12) United States Patent
Scherr et al.

(10) Patent No.: US 9,455,849 B2
(45) Date of Patent: Sep. 27, 2016

(54) EDGE-BASED COMMUNICATION

(71) Applicant: Infineon Technologies AG, Neubiberg (DE)

(72) Inventors: Wolfgang Scherr, Villach/Neulandskron (AT); Christian Reidl, Villach (AT); Michael Strasser, Villach (AT); Veikko Summa, Villach (AT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 14/934,729

(22) Filed: Nov. 6, 2015

(65) Prior Publication Data

US 2016/0065399 A1    Mar. 3, 2016

Related U.S. Application Data

(63) Continuation of application No. 14/318,741, filed on Jun. 30, 2014, now Pat. No. 9,210,015.

(60) Provisional application No. 61/955,997, filed on Mar. 20, 2014.

(51) Int. Cl.
*H03K 7/00* (2006.01)
*H04L 25/49* (2006.01)

(52) U.S. Cl.
CPC .................... *H04L 25/4902* (2013.01)

(58) Field of Classification Search
CPC ............. H04L 25/4902; H04L 12/403; G06F 13/364; G06F 13/4291; G06F 13/36; G06F 13/4295; H03K 7/08; H03K 7/00; H03K 9/00; H03K 9/08

USPC ................ 375/219–220, 238, 257, 295, 377; 326/56, 63; 710/110; 370/212
See application file for complete search history.

(56) References Cited

U.S. PATENT DOCUMENTS

| | | | |
|---|---|---|---|
| 4,388,725 A | 6/1983 | Saito et al. | |
| 4,531,068 A * | 7/1985 | Kraft | H03K 5/023 326/57 |
| 5,646,996 A | 7/1997 | Latka | |
| 5,787,132 A * | 7/1998 | Kishigami | H04L 7/042 370/304 |
| 6,060,906 A * | 5/2000 | Chow | H03K 19/018592 326/121 |
| 6,201,811 B1 | 3/2001 | Larsson et al. | |
| 6,275,550 B1 | 8/2001 | Fukuda | |
| 6,405,337 B1 | 6/2002 | Grohn et al. | |
| 6,496,889 B1 * | 12/2002 | Perino | G06F 13/423 710/110 |
| 6,609,224 B1 | 8/2003 | Jonsson | |

(Continued)

FOREIGN PATENT DOCUMENTS

DE   102008031498 A1   1/2010
JP   S56153866 A   11/1981

(Continued)

OTHER PUBLICATIONS

Final Office Action Dated Sep. 1, 2015 U.S. Appl. No. 14/458,745.

(Continued)

*Primary Examiner* — Khanh C Tran
(74) *Attorney, Agent, or Firm* — Eschweiler & Associates, LLC

(57) ABSTRACT

Methods, devices and systems are disclosed where to generate a pulse a data line is actively driven to a first voltage followed by actively driving the data line to a second voltage.

20 Claims, 6 Drawing Sheets

(56) References Cited

U.S. PATENT DOCUMENTS

| | | | |
|---|---|---|---|
| 6,977,930 B1 | 12/2005 | Epps et al. | |
| 7,027,773 B1 | 4/2006 | McMillin | |
| 7,269,774 B2 | 9/2007 | Sudo | |
| 7,627,121 B1 | 12/2009 | Reeds, III et al. | |
| 7,627,804 B2 | 12/2009 | Bains | |
| 7,653,757 B1* | 1/2010 | Fernald | G06F 1/26 323/222 |
| 7,809,870 B2 | 10/2010 | McDaniel | |
| 8,183,982 B2 | 5/2012 | Scherr | |
| 8,301,972 B2 | 10/2012 | Tang | |
| 8,519,819 B2 | 8/2013 | Scherr | |
| 8,948,280 B2 | 2/2015 | Hammerschmidt et al. | |
| 2004/0107398 A1 | 6/2004 | Johnson | |
| 2005/0127942 A1* | 6/2005 | Smith | H03K 19/177 326/38 |
| 2007/0088883 A1* | 4/2007 | Wakabayashi | B60W 50/06 710/110 |
| 2008/0198917 A1* | 8/2008 | Mignone | H04L 25/4906 375/239 |
| 2009/0046773 A1 | 2/2009 | Scherr | |
| 2010/0002821 A1 | 1/2010 | Hammerschmidt et al. | |
| 2010/0262887 A1 | 10/2010 | Wilson | |
| 2011/0280299 A1* | 11/2011 | O'Malley | H03K 7/00 375/238 |
| 2014/0101349 A1* | 4/2014 | Engl | G06F 13/4072 710/104 |
| 2015/0200706 A1* | 7/2015 | Bottazzi | G01S 7/40 375/140 |
| 2015/0236876 A1 | 8/2015 | Cadugan et al. | |

FOREIGN PATENT DOCUMENTS

| | | |
|---|---|---|
| JP | 58-024925 | 2/1983 |
| JP | 08-023582 | 1/1996 |
| JP | 2003189654 A | 7/2003 |
| JP | 2013017094 A | 1/2013 |

OTHER PUBLICATIONS

Non Final Office Action Dated Apr. 2, 2015 U.S. Appl. No. 14/458,745.

"TLE4998C3, TLE4998C4 Programmable Linear Hall Sensor." Data Sheet, Rev. 1.0, Infineon Technologies AG, Dec. 2008, p. 1-44.

Non Final Office Action dated May 13, 2015 U.S. Appl. No. 14/318,741.

Supplemental Notice of Allowance Dated Sep. 14, 2015 U.S. Appl. No. 14/381,741.

Non Final Office Action Dated Jan. 11, 2016 U.S. Appl. No. 14/458,745.

Kramolis, J. "SENT/SPC Driver for the MPC5510 Microcontroller Family." Freescale Semiconductor, Inc. Document No. AN4219, Rev. 0, Oct. 2010. 28 pages.

U.S. Appl. No. 14/317,661, filed Jun. 27, 2014.

U.S. Appl. No. 14/458,745, filed Aug. 13, 2014.

Non Final Office Action Dated Mar. 18, 2016 U.S. Appl. No. 14/317,661.

Final Office Action Dated Jul. 1, 2016 U.S. Appl. No. 14/458,745.

Notice of Allowance Dated Jul. 27, 2016 U.S. Appl. No. 14/317,661.

* cited by examiner

EDGE-BASED COMMUNICATION

REFERENCE TO RELATED APPLICATION

This application is a continuation of U.S. application Ser. No. 14/318,741 filed on Jun. 30, 2014, which claims priority to provisional U.S. application No. 61/955,997, which was filed on Mar. 20, 2014, the contents of which are incorporated by reference in their entirety.

BACKGROUND

For communication between devices, for example in automotive applications, various protocols are used. One protocol frequently employed is the SENT protocol (single edge nibble transmission). This protocol may for example be used in applications where high resolution data is transmitted for example from a sensor device to an electronic control unit (ECU).

The SPC protocol (short PWM code; PWM meaning pulse width modulation) is an extension of the SENT protocol and aims at increasing performance of a communication link and reducing system costs at the same time. To some extent, SPC allows bidirectional communication and is an example of an edge based PWM protocol. For example, SPC may introduce a half-duplex synchronous communication. A receiver (e.g. master) generates for example a master trigger pulse on a communication line by pulling it low for a defined amount of time. The pulse width (corresponding to the defined amount of time) is measured by a transmitter (e.g. slave), for example a sensor, and a transmission, e.g. a SENT transmission, is initiated only if the pulse width is within a defined limit. The SPC protocol allows choosing between various protocol modes. For example, a synchronous mode, a synchronous mode with range selection or a synchronous transmission with ID selection, where up to four sensors may be connected in parallel to an ECU, may be used. In the latter case, the pulse width of the above-mentioned trigger pulse may define which sensor or other entity will start a transmission. For example, a length of the trigger pulse may indicate an ID of a sensor or other slave device selected for transmission. The sensor or other entity may start the transmission with its own synchronization, which may overlap data pulses, e.g. with a sync pulse which may, but need not, overlap a trigger pulse, followed by data pulses.

In conventional SPC-based communication, on master side and slave side open drain outputs or current sinks are used. In a passive state none of the communication devices (master or slaves) actively drives the line, and the line is held e.g. by a pull-up resistor or, in case of current sinks, e.g. by a sensor. In the latter case, a third connection between devices may be omitted.

In such cases, a rising edge of signals may be influenced by parasitic properties of a communication line, for example by a parasitic capacitive load. This in some circumstances may lead to problems in particular in a pulse identification of the SPC protocol or other edge-based protocol as e.g. it may lead to uncertainties of a time measuring of a trigger pulse which in turn serves as an identification pulse on a slave side. Furthermore, the transmission may be disturbed by such a behavior, which may be referred to as a "higher ohmic" behavior. Disturbances by the parasitic loads may even influence the data transmission itself in some circumstances when they lead to an incorrect recognition of falling edges. A current-based transmission may overcome some of the limitations discussed above for an open-drain setup, but may cause other difficulties like higher power consumption for drivers and EMC (electromagnetic compliance) issues like robustness and emissions during a switching, as in such cases it is desirable to keep the power-dissipating current pulses as short as possible (just as long as required for reliable detection, similar to the edge detection in the open-drain mode).

DETAILED DESCRIPTION

Figure 1:
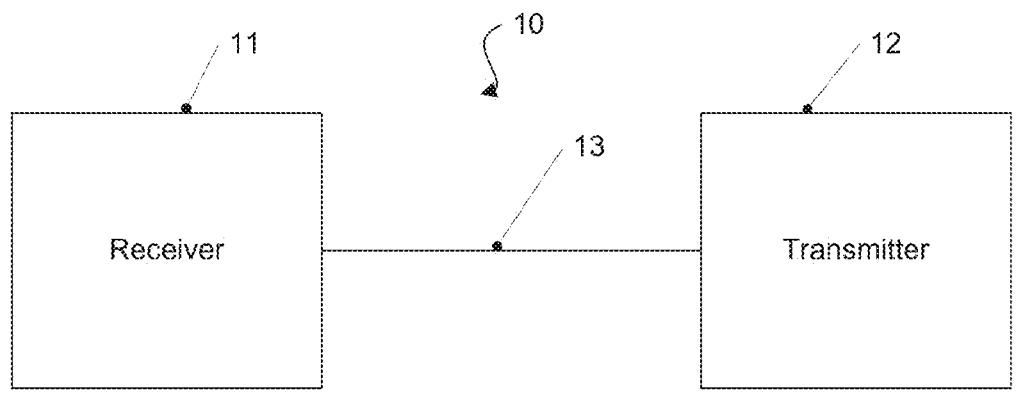
FIG. 1 is a simplified block diagram of a communication system according to some embodiments.

In the following, various embodiments will be described in detail referring to the attached drawings. The embodiments are to be regarded as illustrative examples only and are not to be construed as limiting. For example, while embodiments may be described as comprising a plurality of features or elements, in other embodiments some of these features or elements may be omitted, and/or replaced by alternative features or elements. In yet other embodiments, additional features or elements may be provided.

Any connections or couplings shown in the drawings or described herein may be implemented as direct connections or couplings, i.e. connections or couplings without intervening elements, or indirect connections or couplings, i.e. connections or couplings with one or more intervening elements, as long as the general purpose of the connection or coupling, for example to transmit a certain kind of signal and/or to transmit a certain kind of information, is essentially maintained. Connections or couplings may be wirebased connections or couplings or may also be wireless connections or couplings unless noted otherwise.

Furthermore, features from different embodiments may be combined to form additional embodiments.

In embodiments, extensions to the SPC protocol are proposed. However, these extensions may also be applicable to other communication protocols, for example bidirectional edge-based PWM (pulse width modulation) communication protocols in general.

In some embodiments, a steepness of rising edges may be improved, and/or a stability against disturbances during transmission may be improved. In some embodiments, a push-pull driver is used on a master side and/or on a slave side to provide defined rising and falling edges in a communication system, for example in an SPC-based communication system or any other bidirectional edge-based PWM (pulse width modulation) communication system.

In FIG. 1, a communication system 10 according to an embodiment is shown including a receiver 11 and a transmitter 12. Receiver 11 is communicatively coupled to transmitter 12 via one or more communication paths at 13. In one embodiment, receiver 11 is part of one integrated circuit chip and transmitter 12 is part of another integrated circuit chip. In other embodiments, receiver 11 and transmitter 12 may be part of a same integrated circuit chip. In one embodiment, receiver 11 may be a controller, for example an ECU. In some embodiments, transmitter 12 may be a sensor or other device. In some embodiments, receiver 22 and transmitter 24 may communicate via an SPC protocol or other bidirectional edge-based PWM protocol with additions as outlined below. An edge-based PWM protocol is a protocol where edges of pulse width modulated signals are detected, and information like data to be transmitted is encoded e.g. in pulse lengths of the pulse width modulated signal. In other embodiments, other communication techniques may be used. In some embodiments, transmitter 12 and/or receiver 11 may comprise a push-pull driver for driving signals on communication path 13.

Figure 2:
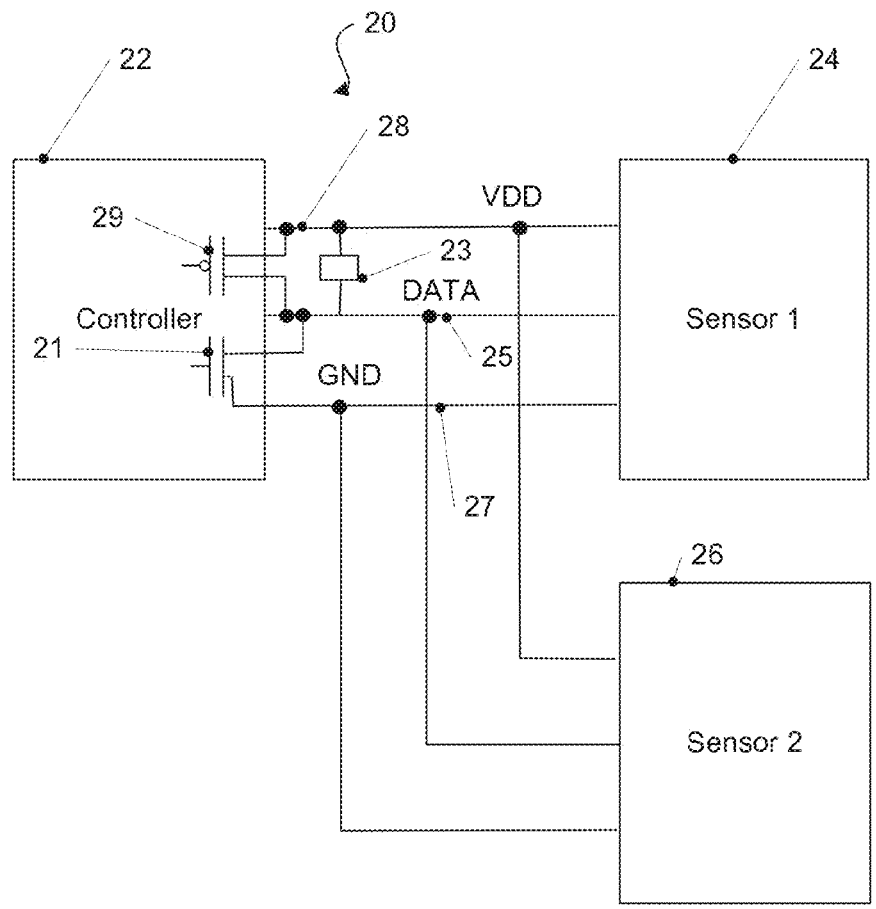
FIG. 2 is a block diagram of a communication system according to an embodiment.

In other embodiments, as illustrated in FIG. 2, a receiver or other controller 22 (e.g. master) may communicate with a plurality of transmitters, for example sensors 24 and 26 in a system 20. Controller 22 in the embodiment shown is electrically coupled to each of sensors 24 and 26 via a three-wire connection. In other embodiments, two-wire connections or any other connections may be used. Controller 22 may communicate with sensors 24 and 26 e.g. based on an SPC protocol or other bidirectional edge-based PWM protocol, with additions or modifications as outlined below. In the embodiment shown in FIG. 2, electrically coupling the three-wire connection controller 22 to first sensor 24 and second sensor 26 comprises a VDD power supply line 28, a data line 25 and a reference line such as ground line 27. In an embodiment, system 20 may be part of an automobile's electrical system. In other embodiments, other numbers of sensors or other components may be used. In an embodiment, controller 22 communicates with first sensor 24 and second sensor 26 via a push-pull driver and one or more pull-up resistors. For example, system 20 includes a pull-up resistor 23 that has a first end electrically coupled to power supply line 28 and a second end electrically coupled to data line 25, and controller 22 includes a first transistor 21 that has one end of its drain-source path electrically coupled to data line 25 and the other end electrically coupled to ground line 27. Furthermore, controller 22 comprises a second transistor 29 that has one end of its drain/source path electrically coupled to data line 25 and the other end electrically coupled to VDD line 28. Transistors 21, 29 jointly form a push-pull driver. By selectively activating one of transistors 21 or 29, data line 25 may either be actively pulled to a first voltage, in this case ground (by activating transistor 21) or actively pushed to a second voltage, in this case VDD (by activating transistor 29). In an inactivated state both transistors 21 and 29 may be deactivated, i.e. switched to a state where the drain/source paths are essentially non-conducting. In some implementations, such a state may be a tri-state. In such an inactive state, pull-up resistor 23 may pull data line 25 towards VDD as long as neither controller 24 nor one of the sensors 25, 26 are active, which in the context of the present application may be seen as "passive", in contrast to an active pushing or pulling by transistors 21, 29 or any other push-pull driver.

Sensors 24 and 26 may comprise open drain transistors (not shown and corresponding to a driver with e.g. only transistor 21) or may comprise push-pull drivers. Controller 22 and each of the first and second sensors 24 and 26 share a single communication path that is communicating via voltage signals on data line 25, e.g. PWM signals.

When communicating for example according to an SPC protocol, controller 22 may transmit a request signal that is received by the first and second sensors 24 and 26 via data line 25. The request signal may include a trigger signal and/or a sensor identification signal, which selects one of the first and second sensors 24 and 26. In addition, a remainder of the request signal may include any other commands and/or data to be transmitted to the selected sensor. For example, the trigger signal may be a pulse where controller 22 via transistor 21 pulls data line 25 to ground, a duration of the pulse indicating an ID of the sensor.

The first and second sensors 24 and 26 receive the request signal including the trigger signal and the sensor identification signal. One of the first and second sensors 24 and 26 is selected via the sensor identification signal, for example encoded in a pulse width, pulse height or other, and the selected sensor transmits a reply signal via data line 28.

In some embodiments, by providing a push-pull driver in controller 22 the above-mentioned trigger pulses may be better defined, in particular as regards rising edges of the trigger pulses, as compared to conventional SPC systems using an open drain output. In embodiments, this may prevent a misinterpretation of the trigger pulse in some cases, for example an interpretation of the trigger pulse indicating a different ID than intended.

Figure 3:
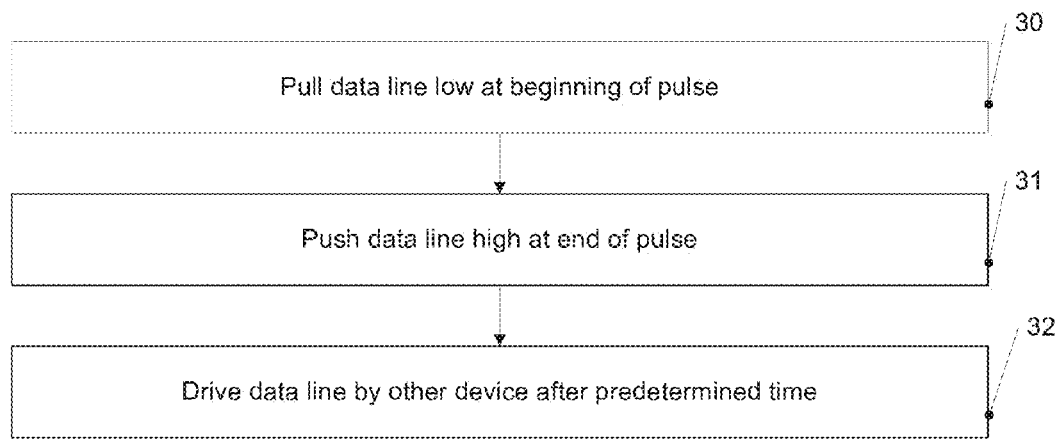
FIG. 3 is a flowchart illustrating a method according to an embodiment.

In FIG. 3, a method according to an embodiment is illustrated. The method illustrated in FIG. 3 may be implemented in the systems of FIG. 1 or 2, for example by driving transistors 21, 29 of FIG. 2 accordingly, but also may be implemented in other devices and systems, for example in devices and systems as will be explained below in further detail.

At 30 in FIG. 3, a data line (e.g. data line 25) is pulled low at a beginning of a pulse, for example using a first transistor of a push-pull driver. The pulse may for example be a trigger pulse in an SPC system or other bidirectional edge-based PWM system. At 31, at the end of the pulse the data line is pushed high, for example to VDD. This may be done for example using a second transistor of a push-pull driver to couple a high potential with the data line.

After the end of the pulse, in some embodiment at 32 the data line may be driven by another device (for example one of sensors 24, 26 in the example system of FIG. 2) after a predetermined time after either the pulling low at 30 or the pushing high at 31. In embodiments, the predetermined time may ensure that no collision between devices occurs on the data line.

In other embodiments, the logic may be reversed. For example, a data line may be pushed high at a beginning of a pulse and pulled low at the end of the pulse in alternative embodiments.

Next, with reference to FIGS. 4-18 various embodiments of communication systems and devices will be discussed and illustrated by example signals. The systems, devices and signals serve merely as non-limiting examples, and for example in other implementations other signals may apply.

Figure 4:
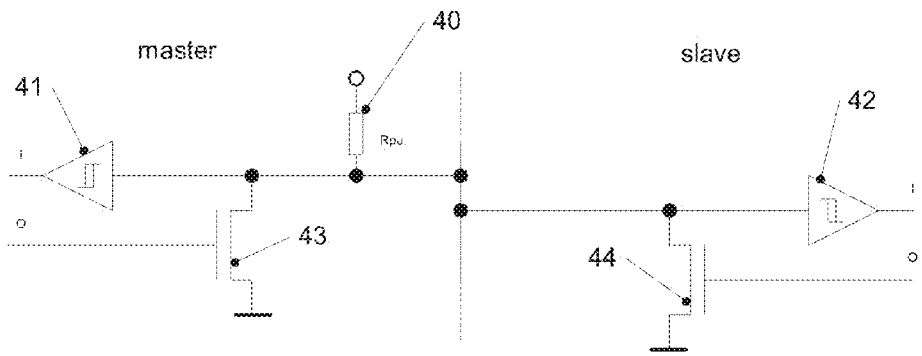
FIG. 4 is a schematic circuit diagram illustrating a communication system.
Figure 5:
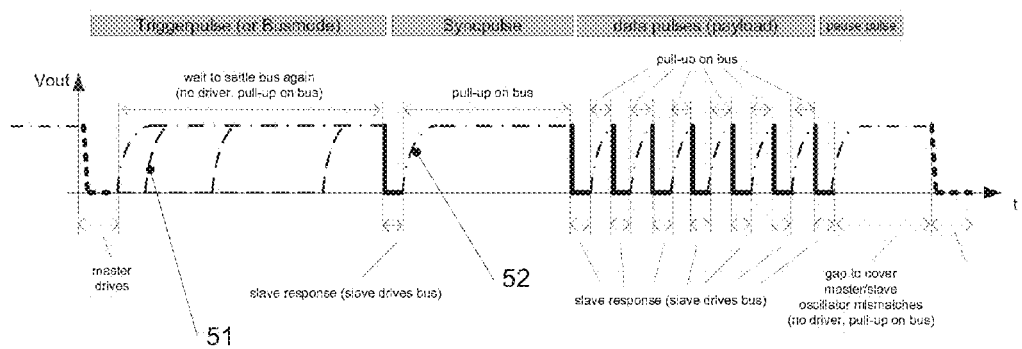
FIG. 5 is a diagram illustrating example signals for the system of FIG. 4.

FIGS. 4 and 5 illustrate a communication system using only open drain drivers for comparison purposes.

In FIG. 4, on a master side a transistor 43 is provided between a data line and ground as an open drain driver, similar to transistor 21 of FIG. 2. Moreover, a pull-up resistor 40 is provided between the data line and a positive voltage, for example VDD. A slicer 41 acts as a receiver on the master side. On a slave side, an open drain transistor 44 between the data line and ground is provided. Moreover, for receiving data, a slicer 42 is provided.

For transmission from master to slave, transistor 43 may actively pull the data line low to generate pulses on the data line. When transistor 43 is inactive, the data line is pulled up towards a positive voltage by pull-up resistor 40. This voltage on the data line or a current detected on the data line is then detected by a slicer 42, which may output for example either a logic 1 or a logic 0 depending on the voltage on the data line. Conversely, for transmission from slave to master, transistor 44 selectively couples the data line to ground to actively pull the data line to ground. Afterwards, the data line is again pulled up towards a positive voltage by pull-up resistor 40 when transistor 44 is inactive.

Examples for signals in the system of FIG. 4 are shown in FIG. 5. In the example of FIG. 5, first the master sends a trigger pulse. During a period labeled "master drive" and which is marked with dashed lines, for example transistor 43 pulls a data line towards ground. At the end of the trigger pulse, transistor 43 becomes inactive (non-conducting between source and drain), and pull-up resistor 40 as indicated by dot-dashed lines and dashed lines 51 pulls the data lines towards a positive voltage. The dot-dashed lines and the dashed lines 51 indicate various possible lengths of the trigger pulse. The length of the trigger pulse may indicate an ID of a slave which is to respond to the trigger pulse, for example one of sensors 24, 26 of FIG. 2. As can be seen, the rising edges as indicated by 51 have a comparatively long rise time, which may depend for example on resistive and/or capacitive loads coupled to the data line. For example, in case the rise time becomes too slow, a pulse may be seen longer as intended, which may lead to incorrect receiving of the trigger pulse.

After a certain waiting time for example after the start or end of the trigger pulse, the slave side drives the bus to first send a sync pulse (labeled sync pulse in FIG. 5) followed by data pulses and a pause pulse). Solid lines show the effect of actively driving a data line by the slave by transistor 44. Each time transistor 44 becomes inactive, pull-up resistor 40 pulls the data line up again, as again indicated by dot-dashed lines. Also in this case, as indicated by 52 rise times and the waveform of the rising edge may depend on for example resistive and capacitive loads coupled to the data line. Also in this case, e.g. depending on the rise times transmission errors may occur.

Figure 6:
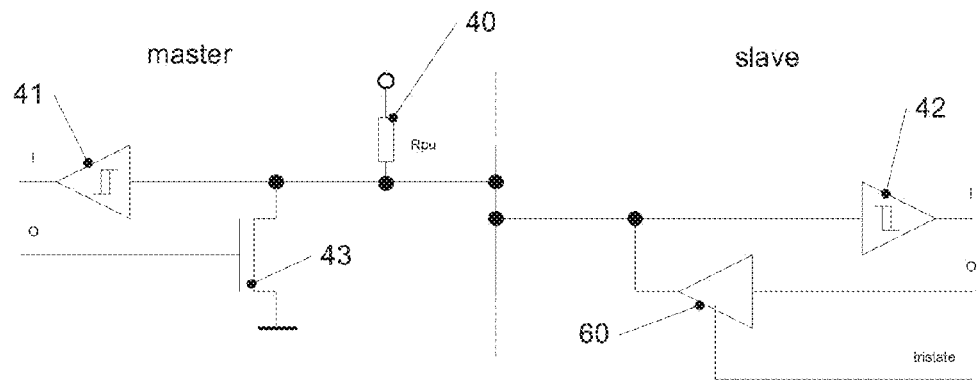
FIG. 6 is a schematic circuit diagram illustrating a communication system according to an embodiment.

In FIG. 6, a communication system according to an embodiment is illustrated. The embodiment of FIG. 6 is based on the system of FIG. 4, and like elements bear the same reference numerals and will not be described again in detail.

In contrast to FIG. 4, open drain transistor 44 is replaced by a push-pull driver 60 in FIG. 6, which may also be set to a tri-state. With push-pull driver 60, the data line may be actively driven to a high or low potential. The system of FIG. 6 may be backwards compatible to previous products based on SPC communication of other bidirectional edge-based PWM communication, for example, in case more than one slave is used.

Figure 7:
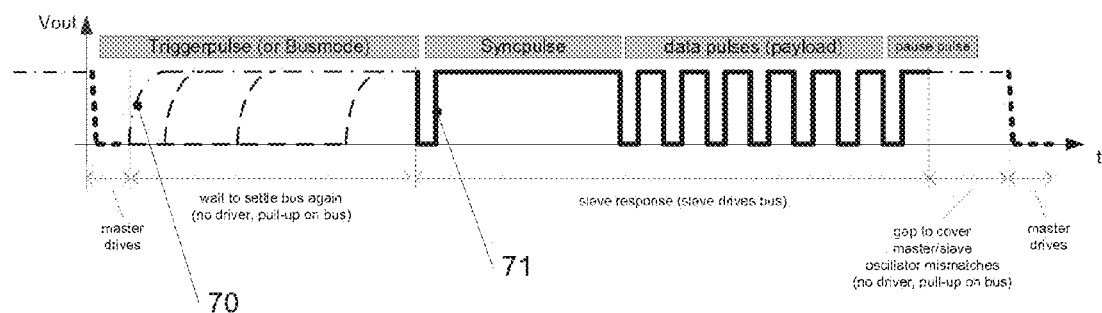
FIG. 7 is a schematic diagram illustrating example signals for the system of FIG. 6.

FIG. 7 illustrates example signals in the system of FIG. 6. The trigger pulse corresponds to the trigger pulse discussed with reference to FIG. 5, where the master drives the data line low using transistor 43, with a pull-up as indicated by 70 which may depend on resistive and/or capacitive loads. On the other hand, on the slave side now a push-pull driver is used, which leads to steeper rising edges in the sync pulse, data pulses and pause pulse, as indicated for example by 71 of FIG. 7. In FIG. 7, essentially the complete transmission of the slave is driven by push-pull driver 60, as indicated by the solid line in FIG. 7.

After the pause pulses, a predetermined waiting time is inserted to cover for example master/slave oscillator mismatches. During this waiting time, only the pull-up resistor pulls the bus to a positive voltage, and no active driving occurs.

Figure 8:
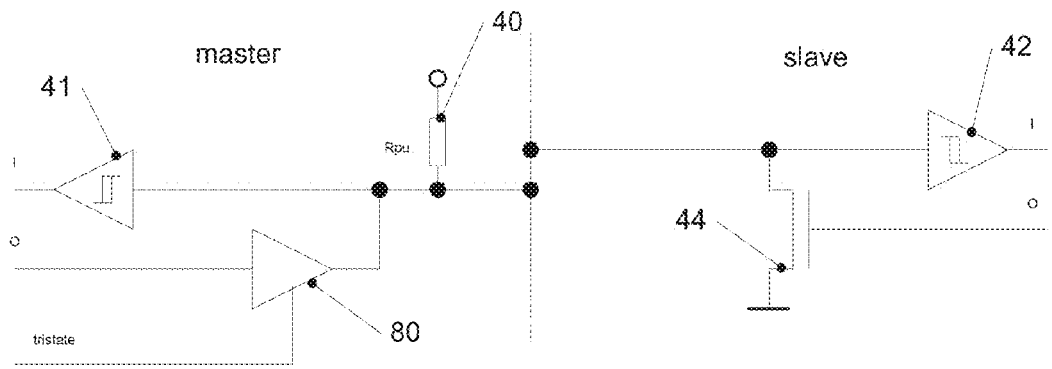
FIG. 8 is a schematic circuit diagram illustrating a communication system according to an embodiment.

In FIG. 8, a further embodiment of a communication system is illustrated. The embodiment of FIG. 8 is again based on the embodiment of FIG. 4, and like elements bear the same reference numerals and will not be described again in detail.

Figure 9:
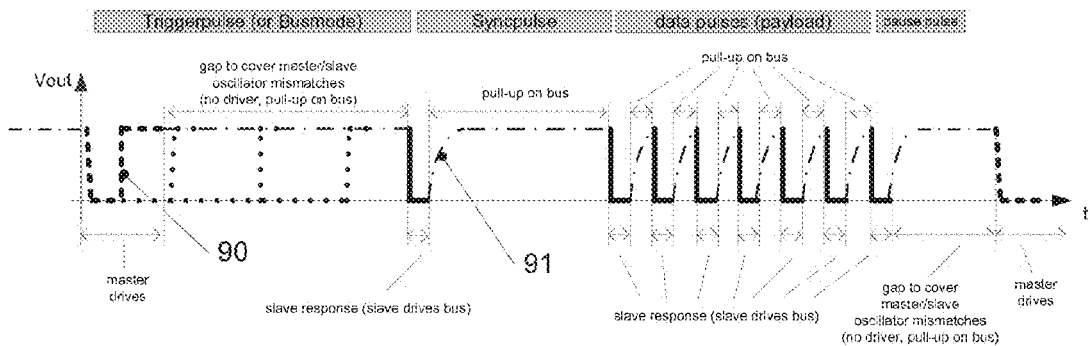
FIG. 9 is a schematic diagram illustrating example signals for the system of FIG. 8.

In contrast to the system of FIG. 4, in FIG. 8 open drain transistor 43 on the master side is replaced by a push-pull driver 80, which also has a tri-state mode. FIG. 9 shows example systems associated with the embodiment of FIG. 8. Here, during the trigger pulse the master also actively drives the data line towards a high voltage at the end of the trigger pulse using the push-pull driver, as indicated by dashed lines for a specific example of a trigger pulse and dotted lines for other possible examples of trigger pulses. As indicated by 90, this in embodiments may lead to steeper or better defined rising edges than in the comparative example of FIG. 5. After the trigger pulse, a gap to cover master/slave oscillator mismatches where no driver is active and only the pull-up resistor 40 pulls the voltage up is provided. The gap may be a predetermined time after the falling or the rising edge of the trigger pulse.

Following the gap, the slave transmission corresponds to the transmission discussed with reference to FIG. 5, where, similar to the rising edge indicated by 52 in FIG. 5, a rising edge 91 may have a waveform and a rise time depending on resistive and capacitive loads.

Figure 10:
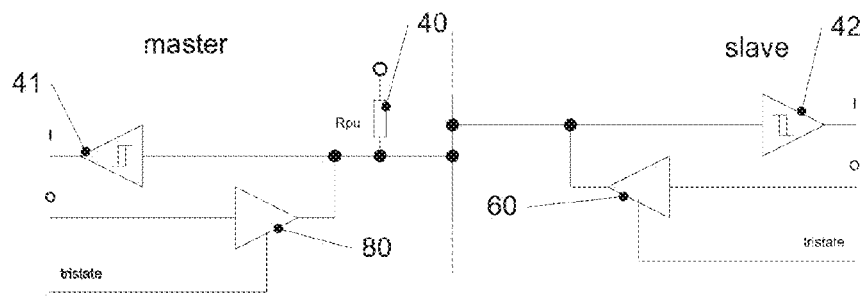
FIG. 10 is a schematic circuit diagram of a communication system according to an embodiment.

In FIG. 10, a further embodiment of a communication system is illustrated, which is again based on the system of FIG. 4. Like elements bear the same reference numerals and will not be discussed again. In the system of FIG. 10, transistor 43 of FIG. 4 has been replaced by a push-pull driver 80, similar to the embodiment of FIG. 8, and transistor 44 has been replaced by a push-pull driver 60, similar to the embodiment of FIG. 6. Therefore, in some respect, the embodiment of FIG. 10 is a combination of the embodiments of FIGS. 6 and 8. Additionally, in embodiments where all devices involved, e.g. all devices connected to a bus, use a push-pull configuration similar to the one shown in FIG. 10, a proper (symmetric) line termination may be used on all devices to reduce reflections on the bus and improve the electrical signal integrity in some embodiments.

Figure 11:
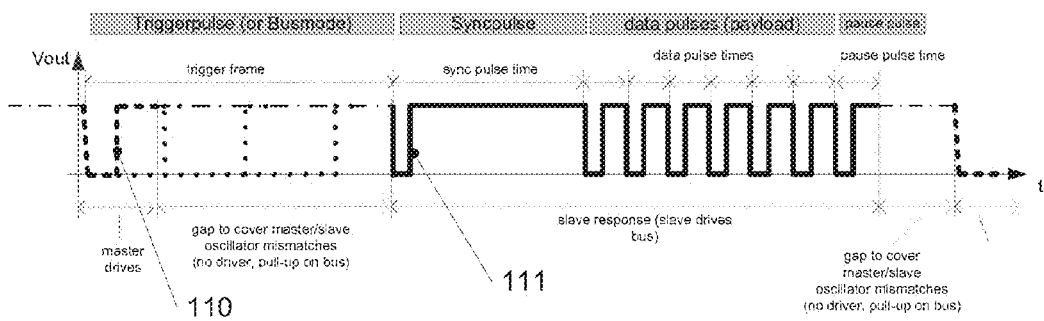
FIG. 11 is a schematic diagram illustrating example signals in the system of FIG. 10.

FIG. 11 illustrates examples for corresponding signals. In this case, during the trigger pulse the signals correspond to the signals of FIG. 9, with comparatively steep rising edges as indicated by 110. During the time the slave drives the bus (sync pulse, data pulses, pause pulse), the curve resembles the curve of FIG. 7, also with comparatively steep rising edges as indicated by 111 in FIG. 11.

Apart from the modifications discussed above, the embodiments discussed with reference to FIGS. 6-11 essentially correspond to the system discussed with reference to FIGS. 4 and 5.

In the examples and embodiments discussed with reference to FIGS. 4-11, following the trigger pulse sent by the master a synchronization pulse is sent by the slave. In other embodiments, the timing may be different, such that the synchronization pulse is transmitted at least partially overlapping with the trigger pulse. This amounts to a change of timing between master and slave and may e.g. be implemented in the communication systems of FIGS. 4, 6, 8 and 10.

Figure 12:
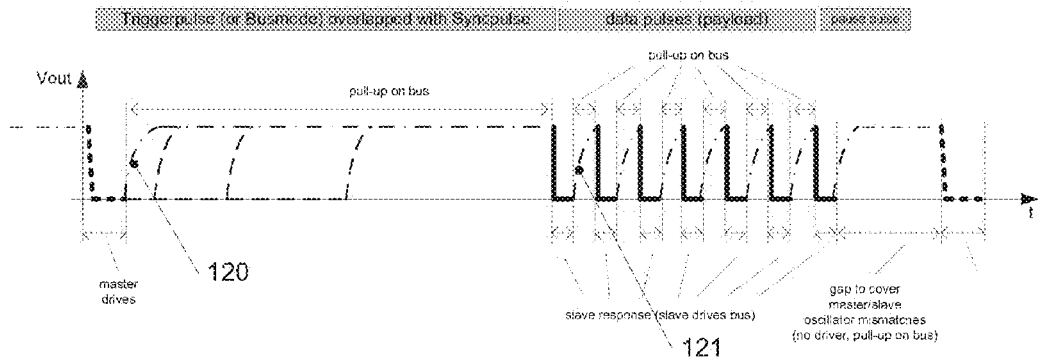
FIG. 12 is a diagram illustrating example signals for the system of FIG. 4 in an alternative implementation.
Figure 13:
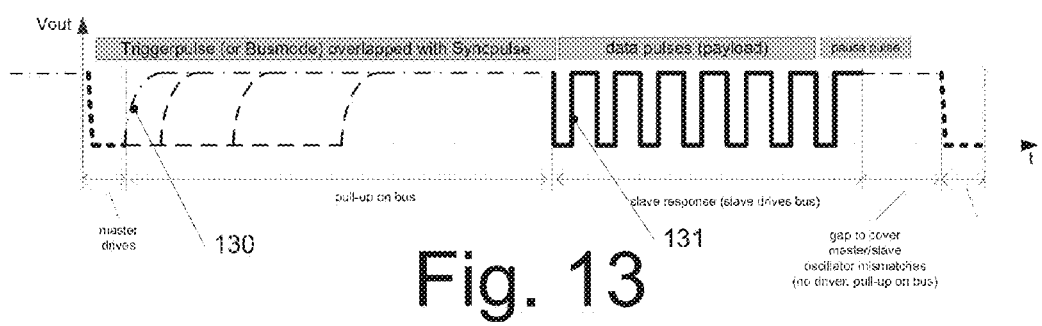
FIG. 13 is a diagram illustrating example signals for the system of FIG. 6 in an alternative implementation.
Figure 14:
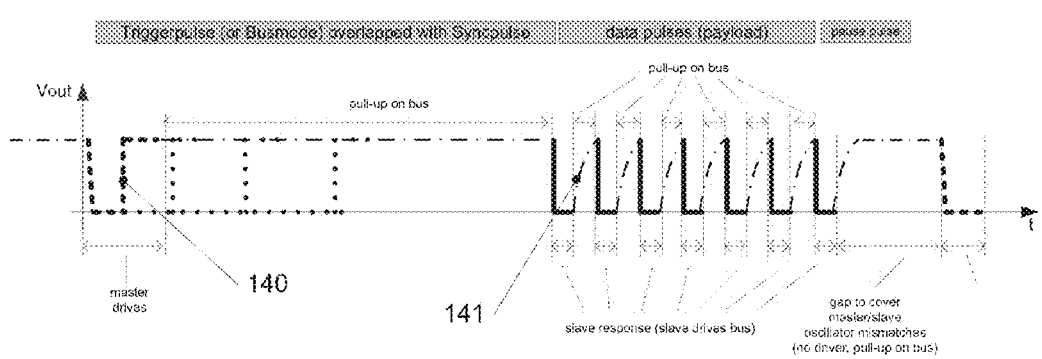
FIG. 14 is a diagram illustrating example signals for the system of FIG. 8 in an alternative implementation.
Figure 15:
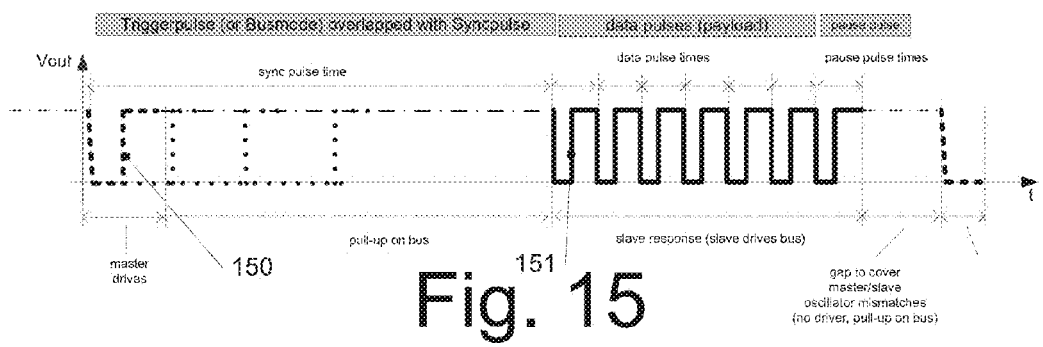
FIG. 15 is a diagram illustrating example signals for the system of FIG. 10 in an alternative implementation.

Signals of such embodiments are illustrated in FIGS. 12-15. FIG. 12 shows example signals for the system of FIG. 4, FIG. 13 shows example signals for the embodiment of FIG. 6, FIG. 14 shows example signals for the embodiment of FIG. 8 and FIG. 15 shows example signals for the embodiment of FIG. 10. Apart from the fact that the synchronization pulse is overlapped with the trigger pulse, the signals in FIGS. 12-15 essentially correspond to the signals of FIGS. 5, 7, 9 and 11, respectively.

In FIG. 12, similar to FIG. 5, as open drain transistors are used on master and slave side, rising edges 120 of the trigger pulse or rising edges of the pulses driven by the slave, as indicated by 121, may have waveforms and/or rise time influenced for example by capacitor or resistor loads, which in some circumstances may lead to transmission errors. In the example of FIG. 13, as a push-pull driver is used on the slave side, as indicated by 131 data pulses driven by the slave side have comparatively steep rising edges, whereas rising edges of the trigger pulse as indicated for example by 130 are similar to the case of FIG. 12.

In the example of FIG. 14 (corresponding to the embodiment of FIG. 8), as a push-pull driver is used on the master side a rising edge of the trigger pulse as indicated by 140 in FIG. 14 is comparatively steep. Rising edges of pulses caused by the slave side have longer rise times and waveforms which may more strongly depend on resistive or capacitive loads, as indicated for example by 141 in FIG. 14. In FIG. 15, corresponding to the embodiment of FIG. 10, both master and slave use push-pull drivers. Therefore, both rising edges of the trigger pulse, for example as indicated by 150, and of pulses caused by the slave, for example as indicated by 151, are comparatively steep with reduced influence by resistive or capacitive loads.

As mentioned, apart from the overlapping synchronization pulse the signals of FIGS. 12-15 correspond to the signals illustrated in FIGS. 5, 7, 9 and 11, respectively. While in FIGS. 4, 6, 8 and 10 only a single slave is shown, other systems may include more than one slave.

Figure 16:
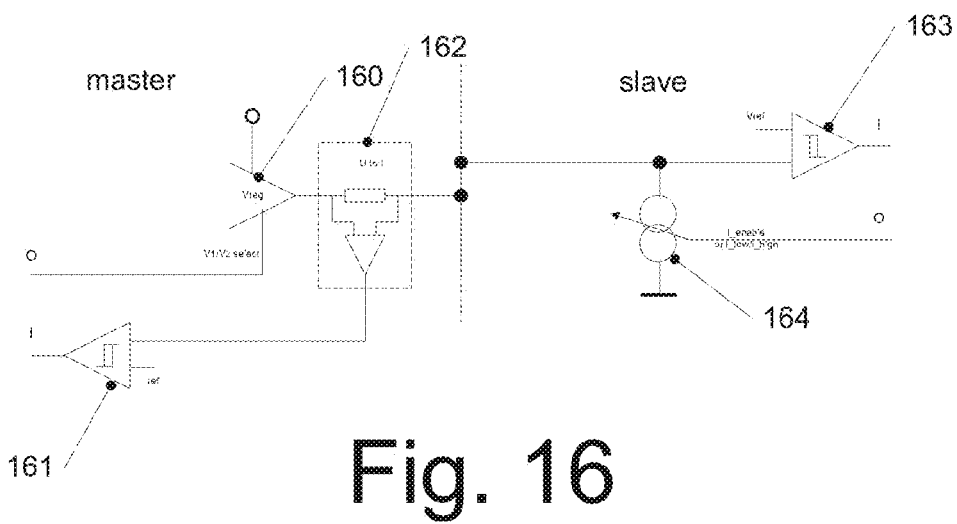
FIG. 16 is a diagram illustrating an example system in an alternative implementation.

In the embodiments discussed above, a push-pull driver for example feeds a current to a data line or absorbs a current from a data line to push the data line to a high voltage or pull the data line to a low voltage, respectively. In other embodiments, other possibilities using voltages and/or currents on a data line may be used, as explained previously. An example is shown in FIG. 16, where on a master side a voltage regulator 160 which selects one of two voltages to supply to a data line is provided. On a slave side, a current source 160 coupled to the data line is provided. Furthermore, on the slave side a slicer 163 is provided to detect voltage signals from the master. On the master side, a voltage to current converter 162 which measures a voltage drop over a resistor and converts the voltage drop to a current as well as a slicer 161 are provided. In such an embodiment, the slave sends current pulses on the data line, and the master sends voltage pulses.

Figure 17:
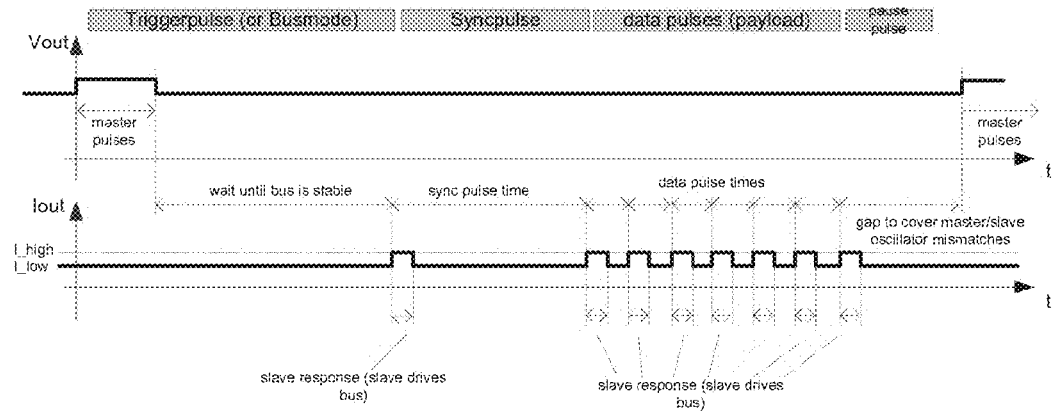
FIG. 17 is a schematic diagram illustrating alternative example signals for the system of FIG. 16.
Figure 18:
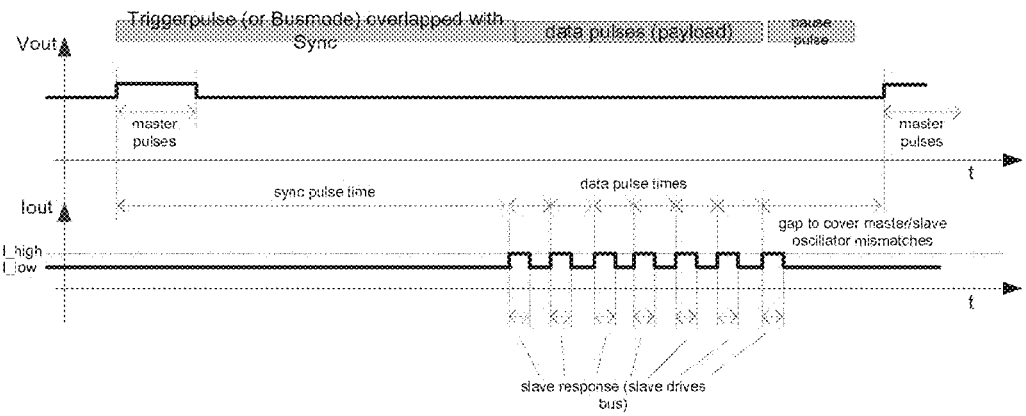
FIG. 18 is a diagram illustrating alternative example signals for the system of FIG. 16.

Examples for corresponding signals are shown in FIGS. 17 and 18. FIG. 17 illustrates a case where a synchronization pulse sent from the slave pulse follows a trigger pulse. The trigger pulse, as shown in FIG. 17 is a voltage pulse, followed by current pulses (synchronization pulse and data pulses as well as a pause pulse) sent by the slave.

FIG. 18 shows a case where the synchronization overlaps with the trigger pulse in the system of FIG. 16. Otherwise, the signals of FIG. 18 correspond to the signals of FIG. 17, i.e. FIGS. 18 and 17 only differ as regards the signal timing. Other kinds of signal generation on a data line may also be applicable and may in embodiments be system-compatible to techniques disclosed herein.

The above-described embodiments serve only as examples and in other embodiments other features or techniques may be used.

What is claimed is:

1. A method, comprising:
   receiving, at a slave device, a pulse on a data line, wherein the pulse is a trigger pulse indicating an identification of a slave device,
   communicating data based on an edge-based pulse width modulation, wherein communicating data comprises driving the data line by a slave device identified by the trigger pulse,
   wherein driving the data line by the slave device comprises transmitting a synchronization pulse after a predetermined time relative to an edge of the trigger pulse, wherein transmitting the synchronization pulse comprises:
      actively driving the data line to a first voltage and to a second voltage different from the first voltage.

2. The method of claim 1, wherein driving the data line by the slave device comprises transmitting one or more data pulses by actively driving the data line to the first and second voltages.

3. The method of claim 1, wherein data pulses comprise sensor data.

4. The method of claim 1, wherein actively driving the data line by the slave device comprises driving the data line to the first voltage at a beginning of the synchronization pulse and driving the data line to the second voltage at an end of the synchronization pulse.

5. The method of claim 1, wherein the trigger pulse identifies the slave device by a pulse length of the trigger pulse.

6. The method of claim 1, wherein the trigger pulse is based on an edge-based pulse width modulation.

7. A method, comprising:
   receiving a pulse on a data line, wherein the pulse is a trigger pulse indicating an identification of a slave device,
   after the trigger pulse, driving the data line by the slave device identified by the trigger pulse based on an edge-based pulse width modulation,
   wherein driving the data line by the slave device comprises transmitting a synchronization pulse overlapping with the trigger pulse, wherein transmitting the synchronization pulse comprises actively driving the data line to a first voltage and to a second voltage different from the first voltage at the end of the synchronization pulse.

8. The method of claim 7, wherein driving the data line by the slave device comprises transmitting one or more data pulses by actively driving the data line to the first and second voltages.

9. The method of claim 8, wherein the data pulses comprise sensor data.

10. The method of claim 7, wherein actively driving the data line by the slave device comprises driving the data line to the first voltage at a beginning of the synchronization pulse and driving the data line to the second voltage at an end of the synchronization pulse.

11. The method of claim 7 wherein the trigger pulse identifies the slave device by a pulse length of the trigger pulse.

12. The method of claim 7, wherein the trigger pulse is based on an edge-based pulse width modulation.

13. A communication device adapted to communicate based on an edge-based pulse width modulation, the device comprising a driver, the driver being configured to actively drive a data line to a first voltage, and actively driving the data line to a second voltage after actively driving the data line to the first voltage to generate a pulse on the data line, wherein the device is configured to receive a trigger pulse identifying the communication device and to wait a predetermined time after receipt of one of a falling edge or a rising edge of the trigger pulse identifying the communication device until generating pulses.

14. The device of claim 13, wherein the driver comprises a push-pull driver.

15. The device of claim 13, wherein the push-pull driver has a tri-state mode.

16. The device of claim 13, wherein the device is a slave device.

17. The device of claim 13, wherein the pulse comprises one of a synchronization pulse or a data pulse.

18. The device of claim 13, wherein the device comprises at least one of a proper line termination, a pull-up resistor or a pull-down resistor.

19. The device of claim 13, wherein the device in configured to receive the trigger pulse as an edge-based pulse width modulated trigger pulse.

20. The device of claim 13, wherein the device comprises a sensor.

* * * * *